Nov. 1, 1949.   J. McDONALD ET AL   2,486,490
WATER HEATING INSTALLATION
Filed Dec. 23, 1947                         2 Sheets-Sheet 2

James McDonald
Walter Hooley  Inventor
By
Attorney

Patented Nov. 1, 1949

2,486,490

UNITED STATES PATENT OFFICE 2,486,490

WATER HEATING INSTALLATION

James McDonald and Walter Hooley, Dudley, England, said Hooley assignor to G. W. B. Electric Furnaces Limited, Dudley, England Application December 23, 1947, Serial No. 793,414
In Great Britain December 20, 1946

Section 1, Public Law 690, August 8, 1946

12 Claims. (Cl. 219—40)

This invention relates to water heating installations and especially to such installations (whether for the production of hot water or for the generation of steam) in which an electrode boiler is supplied with water from a water tank by means of a pump, the electrode boiler being of course supplied with alternating current.

In such installations, the pump supplies water to the boiler whenever the load taken by the boiler or the pressure generated in the boiler is less than a predetermined value and when this value is exceeded, control devices operate and cause the pump to circulate the water to and from the tank.

The load of an electrode boiler is likely to fluctuate fairly rapidly about a mean load and the control devices in consequence have been found to "chatter" and it has been proposed to introduce a delay in the operation of the control device to avoid this chatter.

From one aspect, the present invention provides a water heating installation comprising an electrode boiler supplied by a pump from a water tank and a control device operating to stop the supply of water to the boiler and to circulate the water through the tank and the pump when the load on the boiler exceeds a predetermined amount, the control device comprising a direct current relay supplied with a rectified current proportional to the current to the boiler and controlling the supply of rectified current to a direct current magnetic valve.

From another aspect, a water heating installation comprising an electrode boiler supplied by a pump from a water tank in accordance with the invention, has a direct current operated magnetic valve controlling the supply of water to the boiler which is operated by rectified current from the main alternating current supply to the boiler and the operation of this valve is controlled by a direct current relay supplied through a rectifier from the main alternating current supply to the boiler with current proportional to the load on the boiler.

The relay controls the operation of a contactor which in turn controls the supply of current to the rectifier supplying the magnetic valve.

This magnetic valve contactor is provided with a delay device so that actual operation of the magnetic valve to circulate water to the tank only takes place after the load on the boiler has remained in excess of the predetermined maximum for an appreciable time. Chatter of the magnetic valve is thus eliminated or greatly reduced. Preferably the delay device comprises a pneumatic dash-pot or the like retarding the operation of the contactor in the direction of closure but allowing rapid movement of the relay in the other direction when the load on the boiler fails.

The control relay can be adjusted to operate at any predetermined load on the boiler. It may for example be shunted by a variable resistance, the value of which can be adjusted to cause the relay to operate when the desired load is taken by the boiler.

Other parts of the invention are embodied in the preferred form of water heating installation which will now be described in some detail by way of example with reference to the accompanying drawings in which.

Figure 1:
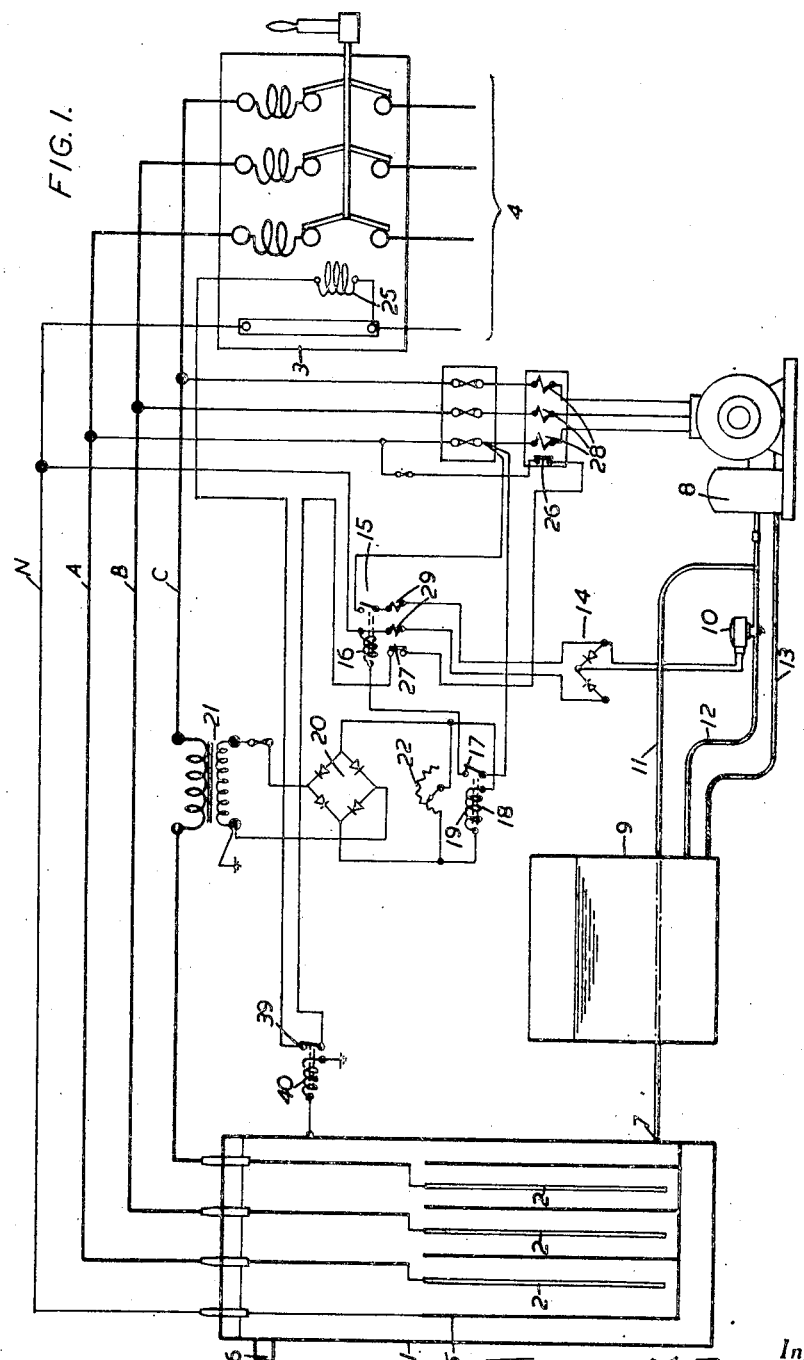
Fig. 1 is a schematic diagram of the water heating installation.

Referring to Fig. 1, the electrode boiler 1 has three electrodes 2 connected through a main oil circuit breaker 3 to the three phases (A, B, C) of a 3-phase alternating current supply 4. The electrodes 2 are surrounded by a shield 5 which is connected to the neutral N of the supply.

The boiler has a steam outlet 6 (in the case where it is used for actual generation of steam) and a cold water inlet 7 through which water may be fed by a pump 8 from a water tank 9. A valve 10 controls the supply of water from the pump 8 and is operable to cause the water to pass either to the boiler 1 through the pipe 11 or back through the pipe 12 to the tank 9 from which the pump draws it through the pipe 13.

When the load on the boiler increases above a predetermined value, the valve 10 operates to allow the water to circulate between the pump and the tank until the water level in the boiler falls sufficiently to reduce the load to a second predetermined value.

The valve 10 is of the direct current magnetic type and is operated by rectified current supplied through a half-wave rectifier 14 and a contactor 15 from between one phase A and the neutral N of the main supply.

This contactor 15 is operated by a solenoid 16 energised on closure of a normally open contact 17 on a control relay 18. The coil 19 of this relay 18 is connected to the output terminals of a full wave rectifier 20, the input terminals of which are connected to the secondary of a transformer 21. The primary of this transformer is connected in one of the lines (as shown phase C) to the electrode boiler so that the current through the relay coil 19 and thus the operation of the relay 18 is dependent upon the load on the boiler.

In order that the relay may be set to operate at a predetermined load current, the relay coil 19 is shunted by a variable resistance 22 which can be adjusted to cause the necessary operating current to flow through the relay coil at any load current over a wide range.

The control relay is sensitive to changes in load and to prevent the consequent hunting due to the inevitably fluctuating boiler load being transmitted to the magnetic valve 10, the contactor 15 operated by the relay is provided with a delay device so that it closes after the load has stayed above the predetermined value for an appreciable time. The arrangement is such that when the load falls, the contactor 15 opens immediately so that a slow make and a quick break is provided.

Figure 2:
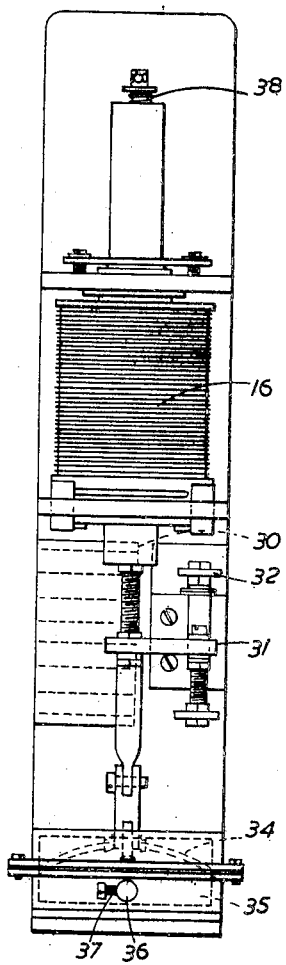
Fig. 2 is a front view.
Figure 3:
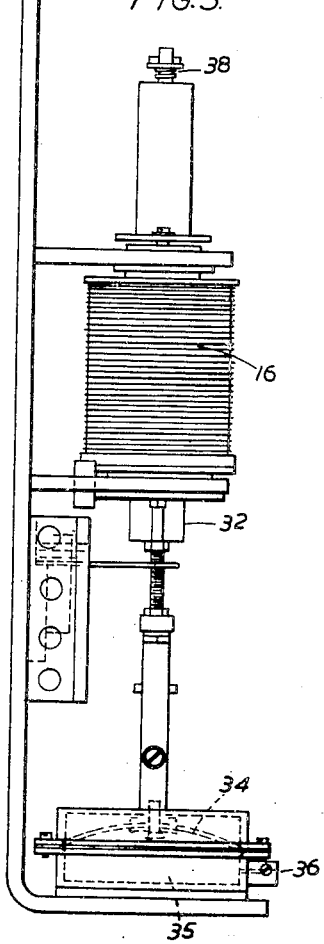
Fig. 3 is a side view of one form of contactor suitable for use in the installation.

As shown in Figs. 2 and 3 the delay device is pneumatic. The solenoid armature 30 (which carries the switch arm 31 making contact with the terminal 32) is connected to a rubber or like diaphragm 34 which forms the top of a chamber 35 having a restricted air inlet 36. This air inlet can be adjusted by a valve screw 37 to vary the delay of the device. A spring 38 at the top of the solenoid armature causes the armature to drop rapidly and break the contact when the load falls.

Interlocks are provided between the main oil circuit breaker, the supply to the pump, the magnetic valve switch and an earth leakage current breaker to render the installation safe despite faults on the pump or the magnetic valve or despite excessive leakage current from the boiler to earth. The no-volt coil 25 on the oil circuit breaker is in series with normally closed contacts 26, 27 which are opened by over-load coils 28, 29 in the supply to the pump motor and to the half wave rectifier 14 respectively. The no-volt coil 25 is also in series with a contact 39 opened by operation of the earth load breaker 40 when excessive earth leakage current flows.

It will be understood that the invention is not restricted to the specific form of water heating installation described which may be modified in detail without departing from the broad ideas underlying it.

We claim:

1. A water heating installation comprising an electrode boiler, a water tank, a pump, a fluid channel connecting the inlet of the pump to the water tank, a fluid channel connecting the outlet of the pump to the water tank, a fluid channel connecting the outlet of the pump to the boiler, a direct current operated magnetic valve controlling the fluid channel between the outlet of the pump and the water tank and means to operate said valve to open said channel to the flow of water when the load on the boiler exceeds a predetermined value.

2. A water heating installation comprising an electrode boiler, a water tank, a pump, a fluid channel connecting the inlet of the pump to the water tank, a fluid channel connecting the outlet of the pump to the water tank, a fluid channel connecting the output of the pump to the boiler, a direct current operated magnetic valve controlling the fluid channel between the outlet of the pump and the water tank, a contactor controlling the electrical supply to the valve and means to operate the contactor to open the valve when the load on the boiler exceeds a predetermined value.

3. A water heating installation comprising an electrode boiler, a water tank, a pump, a fluid channel connecting the inlet of the pump to the water tank, a fluid channel connecting the outlet of the pump to the water tank, a fluid channel connecting the outlet of the pump to the boiler, a direct current operated magnetic valve controlling the fluid channel between the outlet of the pump and the water tank, a rectifier across the output terminals of which the valve is connected, a contactor through which the input terminals of the rectifier is supplied from an alternating current supply and means to operate the contactor to open the valve when the load on the boiler exceeds a predetermined value.

4. A water heating installation comprising an electrode boiler, a water tank, a pump, a fluid channel connecting the inlet of the pump to the water tank, a fluid channel connecting the outlet of the pump to the water tank, a fluid channel connecting the outlet of the pump to the boiler, a direct current operated magnetic valve controlling the fluid channel between the outlet of the pump and the water tank, a contactor controlling the electrical supply to the valve, a direct current relay controlling the operation of the contactor and means operating said relay and causing said valve to open when the load on the boiler exceeds a predetermined value.

5. A water heating installation comprising an electrode boiler, a water tank, a pump, a fluid channel connecting the inlet of the pump to the water tank, a fluid channel connecting the outlet of the pump to the water tank, a fluid channel connecting the outlet of the pump to the boiler, a direct current operated magnetic valve controlling the fluid channel between the outlet of the pump and the water tank, a contactor controlling the electrical supply to the valve, a direct current relay controlling the operation of the contactor, a rectifier across the output terminals of which said relay is connected, a transformer in the supply circuit to the boiler, said rectifier being connected across said transformer and said relay being operated when the boiler current exceeds a predetermined value to close said contactor and operate said valve.

6. A water heating installation comprising an electrode boiler, a water tank, a pump, fluid channels connecting the water tank and the pump in a substantially closed circuit, a fluid channel connecting the electrode boiler to the pump, a direct current operated magnetic valve controlling the fluid channel between the tank and the pump, a rectifier from which current is supplied to the valve, a contactor through which alternating current is supplied to the rectifier and direct current relay means operated by the current to the boiler to close this contactor when the boiler current exceeds a predetermined value.

7. A water heating installation comprising an electrode boiler supplied by a pump from a water tank and a control device operating to stop the supply of water to the boiler and to circulate the water through the tank and the pump when the load on the boiler exceeds a predetermined amount, the control device comprising a direct current relay supplied with a rectified current proportional to the current to the boiler and controlling the supply of rectified current to a direct current magnetic valve.

8. A water heating installation comprising an electrode boiler, a water tank, a pump, a fluid channel connecting the inlet of the pump to the water tank, a fluid channel connecting the outlet of the pump to the water tank, a fluid channel connecting the outlet of the pump to the boiler, a direct current operated magnetic valve controlling the fluid channel between the outlet of the pump and the water tank, a contactor controlling the electrical supply to the valve and means to operate the contactor to open the valve when the load on the boiler exceeds a predetermined value, and means to delay the operation of said contactor until said excess load has continued for a predetermined time.

9. A water heating installation according to claim 8 in which the delay device comprises a pneumatic dashpot.

10. A water heating installation according to claim 8 in which the delay device comprises an air chamber having a restricted inlet, a diaphragm forming one wall of the air chamber, and means connecting the armature of the said contactor to the diaphragm.

11. A water heating installation comprising an electrode boiler, a water tank, a pump, a fluid channel connecting the inlet of the pump to the water tank, a fluid channel connecting the outlet of the pump to the water tank, a fluid channel connecting the outlet of the pump to the boiler, a direct current operated magnetic valve controlling the fluid channel between the outlet of the pump and the water tank, a contactor controlling the electrical supply to the valve, a direct current relay controlling the operation of the contactor, a variable resistance shunted across said relay and means for supplying to the relay current proportional to the current to the boiler, said relay operating and causing said valve to open when the load on the boiler exceeds a predetermined value.

12. A water heating installation comprising an electrode boiler supplied by a pump from a water tank and having a direct current operated magnetic valve, controlling the supply of water to the boiler, which is operated by rectified current from the main alternating current supply to the boiler, the operation of this valve being controlled by a direct current relay supplied through a rectifier from the main alternating current supply to the boiler with current proportional to the load on the boiler.

JAMES McDONALD.
WALTER HOOLEY.

REFERENCES CITED

The following references are of record in the file of this patent:

UNITED STATES PATENTS

| Number | Name | Date |
| --- | --- | --- |
| 1,597,362 | Henriksson | Aug. 24, 1926 |
| 1,665,793 | Sandborgh | Apr. 10, 1928 |
| 1,902,842 | Eaton | Mar. 28, 1933 |